UNITED STATES PATENT OFFICE.

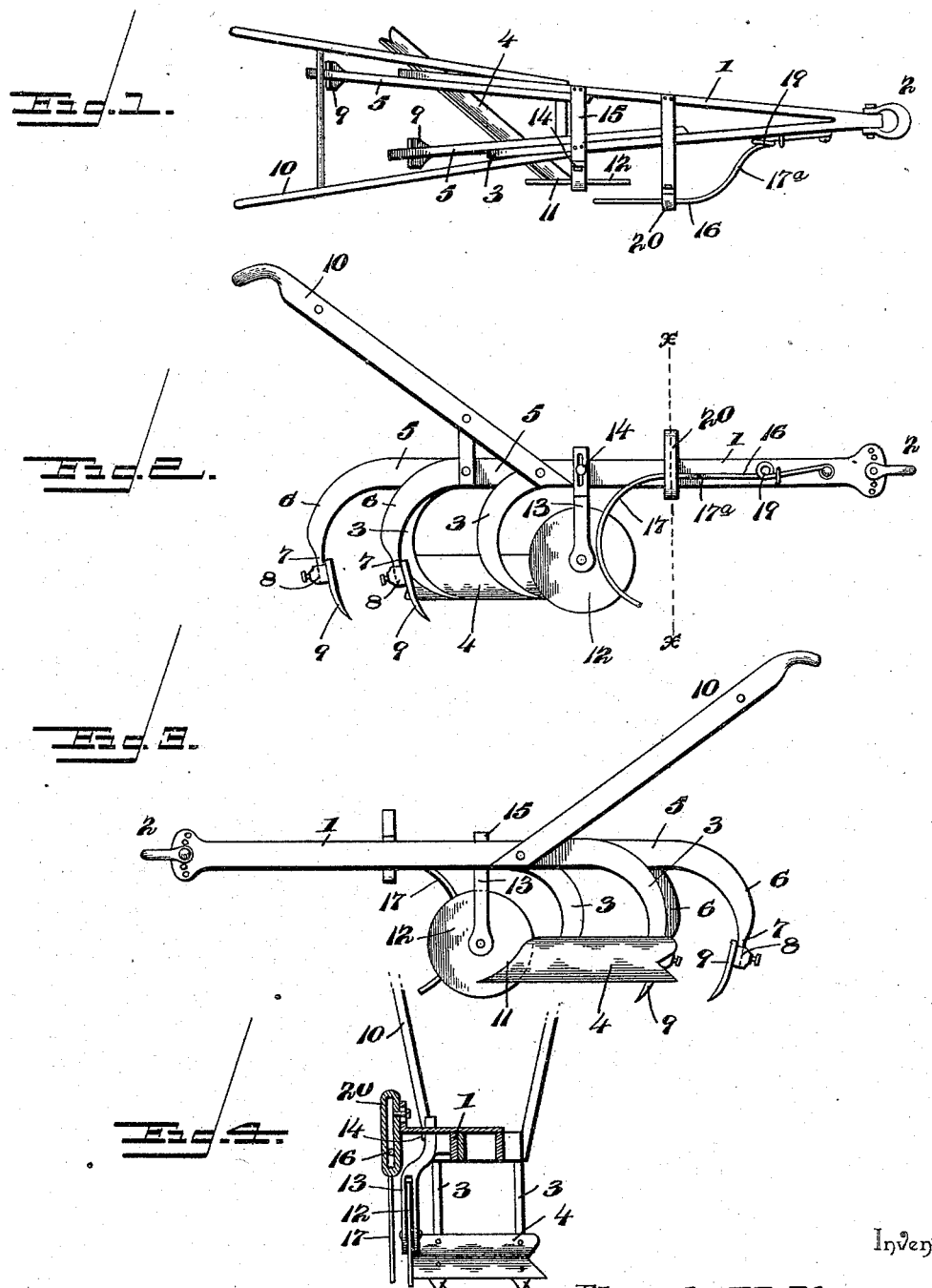

ALEXANDER H. NEEL AND WILLIAM D. DALE, OF SHELBYVILLE, KENTUCKY.

CULTIVATOR.

SPECIFICATION forming part of Letters Patent No. 537,707, dated April 16, 1895.

Application filed June 21, 1894. Serial No. 515,298. (No model.)

*To all whom it may concern:*

Be it known that we, ALEXANDER H. NEEL and WILLIAM D. DALE, citizens of the United States, residing at Shelbyville, in the county of Shelby and State of Kentucky, have invented a new and useful Cultivator, of which the following is a specification.

This invention relates to cultivators; and it has for its object to effect certain improvements in that class of cultivators especially adapted for use in shallow culture. To this end the main and primary object of the present invention is to provide a new and useful cultivator of this character for use in cultivating tobacco, wherein simple and efficient means shall be provided for cultivating close up to the plant without injury thereto, and for leaving the ground in better shape than can be accomplished by the ordinary method of hoeing.

With these and other objects in view, which will readily appear as the nature of the invention is better understood, the same consists in the novel construction, combination, and arrangement of parts hereinafter more fully described, illustrated, and claimed.

In the drawings, Figure 1 is a top plan view of a tobacco cultivator constructed in accordance with this invention. Fig. 2 is a side elevation thereof. Fig. 3 is a similar view from the side opposite to that shown in Fig. 2. Fig. 4 is a transverse sectional view on the line $x$—$x$ of Fig. 2.

Referring to the accompanying drawings, 1—1 designate a pair of rearwardly divergent cultivator beams connected at their front ends to an ordinary clevis 2, and provided at their rear ends with the downwardly curved standards 3. The cultivator beams 1, are of different lengths so as to dispose the rear curved standards 3, thereof diagonally opposite each other, and securely bolted or otherwise suitably secured to the lower extremities of the diagonally opposite standards 3, is the diagonal scraper blade 4. The diagonal scraper blade 4, is secured to the front sides of the standards 3, and projects a slight distance at each end beyond the same, and is arranged to run sufficiently shallow so as to cut and scrape the weeds from the row being cultivated.

Suitably secured to the inner sides of and extended rearwardly from the beams 1, are the rear extension beams 5, that are also of different lengths and are provided at their rear ends with the downwardly curved diagonally opposite shovel standards 6, disposed beyond and in rear of the standards 3, and terminating in the lower pointed ends 7, which detachably receive the shovel sockets 8, at the rear sides of the cultivating shovels or points 9, that are adapted to project below the plane of the lower edge of the diagonal scraper blade 4, to cultivate and pulverize the ground from which the weeds have been cleared by the diagonal scraper blade 4, traveling in advance thereof, and it will of course be understood that the diagonally opposite shovels 9, may be of different sizes according to the size of the plants being cultivated.

A pair of ordinary handles 10, is secured to and braced from the beams of the cultivator to provide for properly guiding the same over the ground being cultivated.

The diagonal scraper blade 4, is beveled at one end as at 11, to fit close up to the inner side of the vertically disposed rotary colter disk 12. The vertically disposed rotary colter disk 12, is arranged directly adjacent to and against the beveled end of the scraper blade 4, and is designed to be adjusted to travel deeper than the said blade 4, to provide means for cutting the crust so as not to tear the plant from its roots, to act in a capacity of a guide for the cultivator, and also to act as a fender to the plants in order to keep the clods back and prevent the same from being thrown onto the plants.

The vertically disposed rotary colter disk 12, is journaled in the depending bifurcated bearing standard 13, which is adjustably connected at its upper end as at 14, to one end of the bracket bar 15, secured on top and transversely of the cultivator beams 1, and by thus supporting the colter the same may be adjusted to work at any desired depth in the ground without disturbing its relative position to the diagonal scraper blade 11, at one end thereof.

At the same side of the cultivator as the rotary colter disk 12, is arranged the off-standing spring clearing finger 16. The finger 16, is provided with a rear forwardly curved portion 17, disposed at one side of the colter disk 11, so as to provide means for holding the tobacco leaves up out of the way of the colter and thereby preventing such leaves from being torn off of the plants, and said spring clearing finger 16, is inwardly bent at its front ends as at 17ª, to provide for disposing the finger off from the cultivator beam, and is secured at its front extremity by means of a screw bolt or other securing device to one of the cultivator beams 1. At a point near its connection with the cultivator beam the spring clearing finger is provided with a spring coil 19 that increases the resiliency of the finger and allows the same to automatically adjust itself up and down as may be occasioned by the particular character of the work. The spring clearing finger 16, is arranged to work in the vertically slotted guide bracket 20, that is adjustably secured to the cultivator beam in advance of the bracket bar 15, and provides means for accommodating the self-adjustment of the clearing finger and also provides for positively adjusting the finger 16, to run high or low as may be required.

From the above it is thought that the construction, operation and many advantages of the herein-described tobacco cultivator will be readily apparent to those skilled in the art without further description, and it will be understood that changes in the form, proportion and the minor details of construction may be resorted to without departing from the principle or sacrificing any of the advantages of this invention.

Having thus described the invention, what is claimed, and desired to be secured by Letters Patent, is—

1. The combination with the cultivator beams having separate pairs of diagonally opposite standards, and the shovels attached to the rear pair of standards, of the diagonal scraper blade secured to the front pair of standards, a vertically adjustable rotary colter disk supported to travel with one side against the front end of said scraper blade, to form a fender at that point and a spring clearing finger having a rear curved end arranged to work at one side and in advance of said colter disk, substantially as set forth.

2. In a cultivator of the class described, the combination with the beams having diagonally opposite standards; of the scraper blade arranged diagonally and secured to the front lower ends of said standards, a vertically disposed rotary colter disk supported to work closely adjacent to the front end of said diagonal scraper blade, a vertically slotted guide bracket adjustably supported at one side of one of the beams, and a curved spring clearing finger disposed at one side and in advance of the colter disk and arranged to work in said bracket, said clearing finger being secured at its front end to one of the beams and provided near such end with a spring coil, substantially as set forth.

In testimony that we claim the foregoing as our own we have hereto affixed our signatures in the presence of two witnesses.

ALEX. H. NEEL.
WILLIAM D. DALE.

Witnesses:
 H. T. FINNELL,
 B. B. COZINE.